United States Patent
Bousset et al.

(10) Patent No.: US 10,077,029 B2
(45) Date of Patent: Sep. 18, 2018

(54) ASSEMBLY OF AN END FITTING AND A DEVICE FOR SPRAYING A LIQUID, WIPER COMPRISING SUCH AN ASSEMBLY, METHOD FOR MOUNTING A DEVICE FOR SPRAYING A LIQUID ON AN END FITTING

(75) Inventors: Xavier Bousset, Mezel (FR); Gérald Caillot, Cernay la Ville (FR); Grégory Kolanowski, Siaugues-Saint-Romain (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 756 days.

(21) Appl. No.: 14/009,847

(22) PCT Filed: Mar. 29, 2012

(86) PCT No.: PCT/EP2012/055597
§ 371 (c)(1),
(2), (4) Date: Jan. 17, 2014

(87) PCT Pub. No.: WO2012/136551
PCT Pub. Date: Oct. 11, 2012

(65) Prior Publication Data
US 2014/0115807 A1    May 1, 2014

(30) Foreign Application Priority Data
Apr. 6, 2011 (FR) ...................................... 11 52991

(51) Int. Cl.
*B60S 1/38* (2006.01)
*B60S 1/52* (2006.01)

(52) U.S. Cl.
CPC ............. *B60S 1/524* (2013.01); *B60S 1/3862* (2013.01); *B60S 1/3894* (2013.01); *B60S 1/3889* (2013.01); *Y10T 29/49826* (2015.01)

(58) Field of Classification Search
CPC ........ B60S 1/524; B60S 1/522; B60S 1/3889; B60S 1/3894
(Continued)

(56) References Cited

U.S. PATENT DOCUMENTS 5,016,312 A * 5/1991 Frimley ................ B60S 1/4038
15/250.04
5,842,251 A * 12/1998 LeFrançois ........... B60S 1/3497
15/250.04
(Continued)

FOREIGN PATENT DOCUMENTS

EP    0860336 A1 *  8/1998  ................ B60S 1/38
EP    1918167 A1 *  5/2008  ............ B60S 1/3808
(Continued)

OTHER PUBLICATIONS

Second Office Action issued in counterpart Chinese Application No. 201280027979.0, dated Jan. 4, 2016 (23 pages).
(Continued)

*Primary Examiner* — Michael Jennings
(74) *Attorney, Agent, or Firm* — Osha Liang LLP

(57) ABSTRACT

The invention relates to an assembly (80) comprising an end fitting (11) that is able to be attached to a longitudinal end of a wiper (70), and also a device (12) for spraying a liquid, said end fitting (11) and said spraying device (12) being two separate pieces that are mechanically connected. According to the invention, said end fitting (11) comprises a cavity (18) which receives a means (41) for securing the spraying device (12) to the end fitting (11).
The invention also relates to a wiper (70) comprising an assembly (80) according to the invention and to a method for mounting such an assembly (80).

15 Claims, 3 Drawing Sheets

(58) Field of Classification Search
USPC .................................. 15/250.04, 250.201
See application file for complete search history.

(56) References Cited

U.S. PATENT DOCUMENTS

| | | | | |
|---|---|---|---|---|
| 6,442,788 B1* | 9/2002 | Fleischer | ............... | B60S 1/522 |
| | | | | 15/250.04 |
| 7,836,541 B2* | 11/2010 | Harita | ................... | B60S 1/3801 |
| | | | | 15/250.04 |
| 2003/0019066 A1* | 1/2003 | Egner-Walter | .......... | B60S 1/381 |
| | | | | 15/250.04 |
| 2009/0013491 A1* | 1/2009 | Su | ........................ | B60S 1/3808 |
| | | | | 15/250.361 |
| 2009/0172907 A1* | 7/2009 | Egner-Walter | ........ | B60S 1/3862 |
| | | | | 15/250.01 |
| 2011/0016653 A1* | 1/2011 | Caillot | ................. | B60S 1/3805 |
| | | | | 15/250.01 |
| 2011/0047738 A1* | 3/2011 | Gross | ................... | B60S 1/3801 |
| | | | | 15/250.04 |

FOREIGN PATENT DOCUMENTS

| | | |
|---|---|---|
| FR | 2 920 729 A1 | 3/2009 |
| FR | 2 923 785 A1 | 5/2009 |
| GB | 2356130 A | 5/2001 |
| WO | 2008/148614 A1 | 12/2008 |

OTHER PUBLICATIONS

International Search Report issued in PCT/EP2012/055597 dated Jun. 14, 2012 (4 pages).

\* cited by examiner

ASSEMBLY OF AN END FITTING AND A DEVICE FOR SPRAYING A LIQUID, WIPER COMPRISING SUCH AN ASSEMBLY, METHOD FOR MOUNTING A DEVICE FOR SPRAYING A LIQUID ON AN END FITTING

The field of the present invention is that of equipment for vehicles, and more particularly that of equipment for wiping the windows of motor vehicles.

Motor vehicles are commonly equipped with windscreen wiper systems for washing the windscreen and avoiding disruption to the driver's view of his surroundings. These windscreen wipers are conventionally driven by an arm that carries out an angular to-and-fro movement and have elongate wipers which themselves carry squeegee blades made of a resilient material. These blades rub against the windscreen and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In this second solution, the wiper is attached to the turning arm of the windscreen wiper by an assembly consisting of a mechanical connector and an adaptor. The mechanical connector is a piece which is crimped directly onto the flat blade, while the adaptor is an intermediate piece which allows the connector to be fastened to the arm of the windscreen wiper. These two pieces are connected to one another by a transverse pin that allows their relative rotation in a plane perpendicular to the windscreen passing through the arm.

Windscreen wipers are also equipped with devices for feeding a windscreen washer liquid which is fed from a tank installed on the vehicle and which is sprayed in the direction of the windscreen by nozzles located either around the windscreen or on the windscreen wiper itself, as is the case with the device disclosed in the document WO2008/148614A1.

The spraying device disclosed in said document is carried by an end fitting which is itself fastened to a wiper frame. However, the way in which the spraying device is arranged is not detailed, and no industrial-scale solution meeting the economic requirements of the automotive sector is shown in said document.

The aim of the present invention is thus to solve the drawback described above, mainly by proposing a technical solution for spraying a liquid onto a window of a motor vehicle, this being realizable from an industrial point of view. In other words, the solution covered by the invention is both reliable and viable from an economic point of view, making it suitable for use in the automotive sector. Similarly, the design of the assembly comprising an end fitting and a spraying device according to the invention makes its mounting on a wiper compatible with the requirements of motor vehicle manufacturers. Finally, such an assembly can be retrofitted easily since it requires only a small adjustment of the length of the wiper.

To this end, the invention proposes an assembly comprising an end fitting that is able to be attached to a longitudinal end of a wiper, and also a device for spraying a liquid, said end fitting and said spraying device being two separate pieces that are mechanically connected.

According to the invention, said end fitting comprises a cavity which receives a means for securing the spraying device to the end fitting.

The invention thus consists in designing an assembly of a spraying device and an end fitting of a wiper, the spraying device comprising at least one fastening element that passes into a hole in the end fitting.

According to one aspect of the invention, the end fitting comprises a recess which is able to receive a heel of a constituent wiper blade of the wiper and which extends along a longitudinal axis and in a first plane, said cavity having an opening formed on a peripheral wall of the end fitting and which extends transversely to the longitudinal axis. Advantageously, said cavity extends parallel to the first plane and perpendicularly to the longitudinal axis.

According to another aspect of the invention, said opening is located on a flank of the peripheral wall which extends perpendicularly to the first plane.

According to one exemplary embodiment, the end fitting has a profile complementary to the profile of a constituent support of the wiper. The constituent support of the wiper comprises, for example, an air deflector and a device for holding a vertebra and a wiper blade. By virtue of its profile, the end fitting can thus be positioned in a simple manner on the end of the wiper and play a part in holding some of the constituent elements of the wiper, while respecting the overall appearance of the wiper.

In a complementary manner, the end fitting also comprises a housing that is able to receive a constituent vertebra of the wiper, the housing being separated from the recess by an intermediate wall. The housing extends, for example, in the same direction and in one and the same plane as the recess.

Advantageously, the means for securing the spraying device comprises at least one clip-fastening means and a retention means. In other words, the securing means comprises at least one means that enables the spraying device to be coupled to or anchored on the end fitting and means for holding it in a position desired in advance. Such a solution thereby improves the mechanical retention of the spraying device on the end fitting.

According to one aspect of the invention, the spraying device comprises a duct having an inlet orifice and a means for spraying a liquid, the retention means being in the form of a plurality of protuberances which originate on the duct.

In a complementary manner, at least two protuberances are offset in the direction of extension of the duct so as to allow the peripheral wall of the end fitting to pass between the two protuberances. The wall of the end fitting is thus positioned between these two protuberances.

According to another aspect of the invention, the clip-fastening means comprises two branches that are each provided with a distal end comprising a tooth that is able to lock said two branches inside said cavity. The two teeth are thus clip-fastened inside the cavity of the end fitting in order to improve the mechanical retention between the spraying device and the end fitting.

In an alternative or complementary manner to the previous paragraph, said clip-fastening means comprises a U-shaped extension, the central part of the U being provided with a fin which is inclined with respect to a plane in which the extension extends and which is able to lock said extension inside said cavity. In this variant, it is thus the inclined fin which is clip-fastened inside the cavity of the end fitting in order to improve the mechanical retention between the spraying device and the end fitting.

According to one exemplary embodiment, said duct has an elbow.

According to one aspect of the invention, said spraying means is produced in one piece with said duct. It will be understood here that the spraying means and the duct are produced as a single piece, that is to say they are moulded simultaneously from one and the same material. This solution has the advantage of providing a spraying device without an added piece, thereby making it easier to manufacture.

Alternatively, said spraying means is a piece added to said spraying device. In such a situation, it is possible, for example, to change the position of the spraying means in order, in particular, to direct the liquid emerging from an orifice present on the spraying means.

The invention also relates to a wiper comprising at least one vertebra, a wiper blade, a support and an assembly as per any one of the preceding features.

The invention furthermore relates to a method for mounting an assembly comprising an end fitting that is able to be attached to a longitudinal end of a wiper, and also a device for spraying a liquid, said end fitting and said spraying device being two separate pieces that are mechanically connected, said spraying device comprising a retention means and a clip-fastening means, said end fitting comprising a peripheral wall, a cavity and a recess receiving a heel of a blade of the wiper which extends along a longitudinal axis and in a first plane.

According to the invention:
the spraying device is inclined with respect to the longitudinal axis, in the first plane;
the retention means is fitted onto the peripheral wall;
the spraying device is rotated in the first plane in order to house the clip-fastening means in the cavity.

Thus, by virtue of the invention, it is possible, in a simple and reliable manner, to position a spraying device on and remove it from an end fitting of the wiper. Specifically, the means for securing the spraying device and the cavity of the end fitting which receives it, as explained hereinabove, represent a technical solution that is simple to implement, is reliable and meets the economic constraints that exist in the automotive sector.

Another advantage lies in the compactness of the wiper comprising the assembly according to the invention. Specifically, it is possible to feed the windscreen washer liquid as close as possible to the wiper blade, thereby making it possible to optimize its use.

The appended figures will make it easy to understand how the invention can be realized. In these figures, identical references denote similar elements.

It should be noted that the figures explain the invention in a detailed manner so as to implement the invention, and said figures can of course serve to define the invention more clearly, where necessary.

Figure 1:
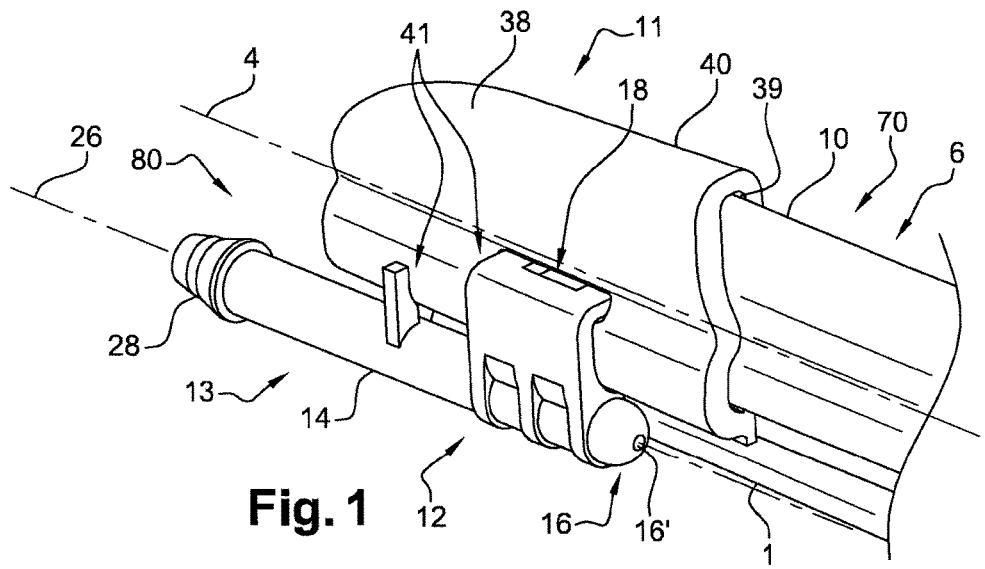
FIG. 1 is a perspective view of one end of a wiper equipped with an exemplary embodiment of an assembly according to the invention.

The invention may find an application on a wiper as shown partially in FIG. 1.

The wiper 70 is part of a wiping system mounted on a motor vehicle. This wiper 70 is, for example, installed on the front windscreen of the vehicle, but it may also be mounted on the rear window of the latter.

The wiper comprises a wiper blade 1, also known as a squeegee blade, consisting of a zone for rubbing against the window, connected to a heel via a thinned portion of the wiper blade. This heel provides the mechanical connection to a constituent support 6 of the wiper. This wiper blade 1 extends lengthwise along a longitudinal axis 4.

The wiper 70 furthermore comprises a vertebra (with the reference 5 in FIG. 2) which forms a device for stiffening the wiper. By way of example, this is a single metal strip which extends along the longitudinal axis 4, thus defining its length, and which has at rest a convex curvature with respect to the windscreen. This strip has a predetermined flexibility, which, by deforming when the wiper is pressed against the windscreen, brings about a force distributed along the wiper blade 1.

The blade 1 and the vertebra are held by the support 6 which thus forms a longitudinal supporting frame covering and holding the vertebra 5 and the wiper blade 1. This support 6 thus provides a mechanical connection between the blade 1 and the vertebra 5. It furthermore comprises an air deflector 10, the function of which is to increase the pressing force of the wiper against the windscreen to the benefit of the aerodynamic effect of the air. In this exemplary embodiment, the air deflector 10 and the support 6 form a common assembly. They are for example moulded from one and the same flexible material, such as a rubber or an elastomer.

At the end of the wiper there is fitted an end fitting 11. In a general manner, this end fitting 11 carries out a multiplicity of functions:
it is involved in the mechanical retention of a spraying device 12 on the wiper;
it allows the wiper blade 1 to be mounted, removed and optionally secured with respect to the support 6, it being possible for said wiper blade 1 to be replaced by translation of the blade with respect to the support 6;
it ensures an aesthetic finish for the end of the wiper 70.

The term "securing" should be understood here as meaning a means for preventing the translation of the wiper blade 1 with respect to the support 6. Thus, once the end fitting 11 is in place, any movement in translation of the wiper blade 1 is prevented, thereby ensuring that the latter is fastened perfectly with respect to the rest of the wiper.

The end fitting 11 comprises a peripheral wall 38 having an inwardly directed face, known as the inner face 39, the section of which is complementary to the section of the support 6 and of the deflector 10, and an outwardly directed face of the end fitting 11, known as the outer face 40. The end fitting 11 thus has a profile complementary to the profile of the constituent support 6 of the wiper 1. The expression "complementary profile" should be understood here as meaning that the end fitting 11 has a section complementary to a section of the support 6 such that the support 6 can be inserted into the end fitting 11. These profiles correspond to a cross section made in a plane perpendicular to the longitudinal axis.

FIG. 1 also shows an exemplary embodiment of the device 12 for spraying a windscreen washer liquid. Such a spraying device supplies a quantity of liquid onto the glazed surface so as to favour the cleaning of the latter by the scraping action of the wiper 70.

This spraying device 12 is mounted on the end fitting 11, at one end of the wiper 1 along the longitudinal axis 4.

Such a spraying device 12 comprises at least one liquid circulation duct 13. The duct 13 is in the form of a hollow and cylindrical tube 14 which has, at a first longitudinal end, a liquid intake orifice 15, and, at a second end opposite the first end with respect to the tube 14, a means 16 for spraying the liquid provided with a spraying orifice 16'.

At the end provided with the intake orifice 15, the spraying device 12 may comprise a connector 28 for hydraulically connecting the spraying device 12 to a hydraulic system connected to a tank containing the windscreen washer liquid.

The end fitting 11 and the spraying device 12 are connected together mechanically and form an assembly 80 in accordance with the invention.

According to the invention, the end fitting 11 comprises a cavity 18 which receives a means 41 for securing the spraying device 12 to the end fitting 11.

Figure 2:
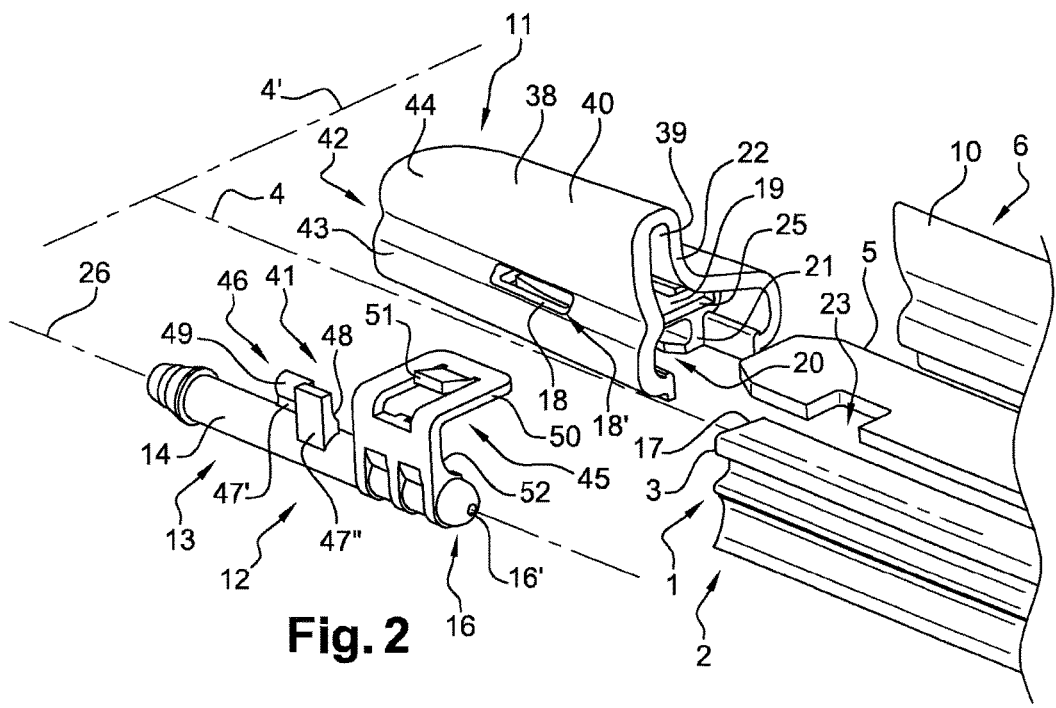
FIG. 2 is an exploded view of FIG. 1.

FIG. 2 shows in greater detail the constituent elements of the wiper 70. The assembly 80 comprising the end fitting 11 and the spraying device 12 according to the invention is thus shown in a detailed manner in FIG. 2 in an exploded perspective view, that is to say prior to being mounted on one another.

The wiper blade 1 has, as seen previously, the rubbing zone 2 and the heel 3 delimited by an upper wall 17. The vertebra 5 comprises a cutout 23 realized on one side of the vertebra 5. Such a cutout is involved in securing the end fitting 11 to the wiper.

The peripheral wall 38 at least partially delimits a volume in which a housing 19 and a recess 20 extend.

The housing 19 is able to receive the vertebra 5 while the recess 20 is able to receive the wiper blade 1, more specifically the heel 3 of the blade.

The housing 19 is formed in the constituent plastics material of the end fitting 11. This housing 19 corresponds to a removal of material having a section complementary to the section of the vertebra 5. Such a housing 19 extends in a direction parallel to the longitudinal axis 4, in a first plane, that is to say a plane parallel to the plane in which the vertebra 5 extends. This housing 19 is thus delimited on one side by a constituent upper face of the end fitting 11 and on the other side by an intermediate wall 25. Laterally, this housing 19 is bordered by two walls that are attached to the inner face 39 of the peripheral wall 38.

The recess 20 receives the heel 3 of the wiper blade 1. This recess 20 extends longitudinally in the end fitting 11 in a direction parallel to the longitudinal axis 4. Such a recess 20 is opposite the housing 19 with respect to the intermediate wall 25. It will be understood that the latter delimits both the housing 19 and the recess 20. The end fitting 11 also comprises a cutout which is aligned with the recess 20 and which opens the latter towards the surroundings of the end fitting 11. Such a cutout, having a width less than the width of the recess 20 measured along a transverse axis perpendicular to the longitudinal axis 4, allows the thinned portion of the heel 3 to pass through.

It will be noted that the end fitting 11 comprises a face 21 into which the housing 19 and the recess 20 open. This face 21 extends in a plane perpendicular to the longitudinal axis 4 and this face 21 is formed in a manner set back from an edge 22 which terminates the peripheral wall 38.

The cavity 18 has an opening 18' formed on the peripheral wall 38, at the outer face 40. In particular, the opening 18' is formed on a flank 42 of the outer face 40. This flank 42 extends perpendicularly to the first plane, that is to say perpendicularly to the housing 19 or to the recess 20. The flank 42 has two surfaces located on either side of an axis parallel to the longitudinal axis 4: a lower convex surface 43 and an upper convex surface 44. In the example shown in FIG. 2, the opening 18' is formed on the lower convex surface 43 of the flank 42.

The cavity 18 thus starts at the opening 18' and extends towards the interior of the end fitting 11, transversely to the longitudinal axis 4. The cavity 18 extends, in a particularly advantageous manner, perpendicularly to the longitudinal axis 4, in a plane parallel to the first plane, thereby making it possible to avoid any mechanical interference between the clip-fastening means and the vertebra or the wiper blade.

A device 12 for spraying a windscreen washer liquid, said device 12 being a constituent part of an assembly according to the invention, and in particular the securing means 41 thereof, is also shown in a detailed manner in FIG. 2. The spraying device 12 extends in a direction, known as a central direction 26, parallel to the longitudinal axis 4 and central to the duct 13. The securing means 41 comprises at least one clip-fastening means 45 and retention means 46.

The retention means 46 is advantageously in the form of a plurality of protuberances 47 projecting from the duct 13. The plurality of protuberances thus originate on the duct 13. The example shown in FIG. 2 shows a retention means 46 comprising two protuberances 47: a first protuberance 47' and a second protuberance 47" located closer to the spraying means 16 than the first protuberance 47'. The first protuberance 47' and the second protuberance 47" are each in the form of a rectilinear branch. They extend in a direction perpendicular to the first plane.

The first and the second protuberance are thus offset from one another in the central direction 26 but also in the direction of an axis perpendicular to the longitudinal axis 4, known as the lateral axis 4' and forming the first plane with the longitudinal axis 4. In practice, the first protuberance 47' is moulded on a first side of the tube 14 while the second protuberance is moulded on a second side of the tube 14 opposite the first side with respect to the central direction 26 of the spraying device 12. Following this lateral axis 4', they are offset from one another by a distance corresponding approximately to the thickness of the peripheral wall 38 of the end fitting 11 in order to ensure their role as a retention means once the spraying device 12 is mounted on the end fitting 11.

Thus, the second protuberance 47" comprises a concave surface 48 having a form corresponding to the lower convex surface 43 of the flank 42 of the end fitting 11. Once the assembly 80 has been assembled, and as can be seen in FIG. 1, the concave surface 48 of the second protuberance 47" is in contact with the lower convex surface 43 of the flank 42 of the end fitting 11.

In the same way, the first protuberance 47' comprises a convex surface 49 having a form corresponding to a portion of the inner face 39, having a concave form, known as the concave portion and located on the other side of the peripheral wall 38 with respect to the lower convex surface 43 of the flank 42. Once the assembly 80 has been assembled, and as can be seen in FIG. 1, the convex surface 49 of the first protuberance 47' is in contact with the concave portion of the inner face 39.

The convex surface 49 and concave surface 48 of the two protuberances 47' and 47" thus perfectly match the inner and outer faces of the peripheral wall 38 of the end fitting 11 against which they are arranged.

The clip-fastening means 45 comprises, in an embodiment illustrated in FIG. 2, a U-shaped extension 50, the central part of the U being provided with a fin 51 which is directed towards the ends of the U. The fin 51 is inclined with respect to a plane in which the extension 50 extends. Such a fin 51 is able to lock the extension 50 inside the cavity 18.

The extension 50 is connected to the duct 13 of the spraying device 12 at the distal ends of the U by a base 52 that projects from the duct 13. The base 52 and the extension 50 are advantageously produced in one piece with the spraying device 12. The extension 50 extends in a plane perpendicular to a plane in which the base 52 extends.

The extension 50 has a form complementary to the cavity 18. Thus, once the assembly 80 has been assembled, the extension 50 is housed inside the cavity 18 and the fin 51 is inserted into a deformation having a space complementary to the form thereof, making it possible for it to lock the extension 50 inside the cavity 18 and thus to ensure a mechanical connection between the spraying device 12 and the end fitting 11.

The example illustrated in FIG. 2 shows another aspect of the invention, according to which the spraying means 16 is produced in one piece with the duct 13.

Thus, according to the example illustrated in FIG. 2, the elements which the spraying device 12 comprises, that is to say the inlet orifice 15, the tube 14, the retention means 46, the clip-fastening means 45 and the base 52 are all produced in a single piece. It will be understood here that all of these elements are moulded simultaneously from one plastics material. They thus form an assembly which is inseparable without destroying one or another of these elements.

Figure 3:
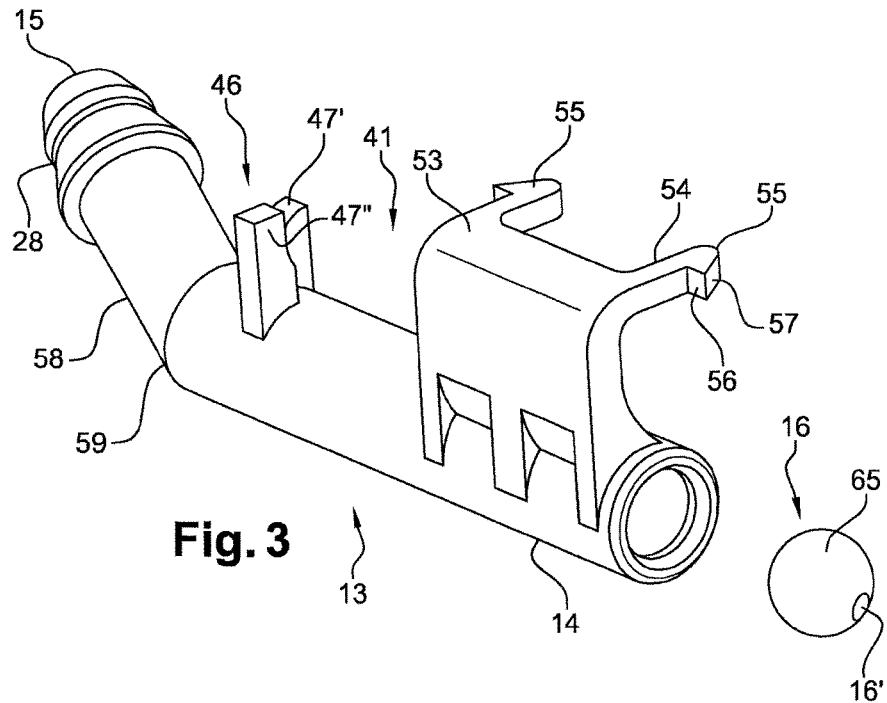
FIG. 3 is a perspective view of a variant embodiment of a spraying device of the assembly in accordance with the invention.

Variant embodiments of the spraying device 12 are shown in FIG. 3.

The clip-fastening device 45 comprises in this case two branches 53 and 54 which are each provided with a distal end comprising a tooth 55 which is able to lock the two branches inside the cavity 18. The two branches 53 and 54 are connected to the duct 13 by a base 52 identical to the base in the embodiment comprising the extension 50. The two branches 53 and 54 extend in a plane perpendicular to the plane in which the base 52 extends, that is to say they extend in a plane parallel to the first plane.

The teeth 55 project from the branches 53 and 54 and extend in the same plane as the branches. In other words, they have a first face 56 perpendicular to a direction of extension of the branches 53 and 54 and a second face 57 which connects the end of the first face 56 to the end of the branch on which the tooth is located.

In this way, once the assembly 80 has been assembled, the two branches 53 and 54 are located inside the cavity 18 and each tooth 55 is housed in a deformation having at least one edge which engages with the first face 56, enabling them to ensure their role of clip-fastening and or anchoring the branches 53 and 54 in the cavity 18, and more generally of ensuring a mechanical connection between the spraying device 12 and the end fitting 11.

In the variant embodiment shown in FIG. 3, the duct 13 has a portion 58 forming an elbow 59 with respect to the rest of the duct 13. This portion 58 is located between the retention means 46 and the inlet orifice 15 located at one end of the duct 13. It will thus be understood that the tube 14 is formed from two rectilinear portions that are connected together by the elbow 59.

FIG. 3 also shows an embodiment of the invention according to which the spraying means 16 is a piece added to the spraying device 12.

The spraying means 16 is in this case a ball 65, also provided with a spraying orifice 16'. Its diameter is approximately the same as the inside diameter of the duct 13. In this way, it is possible to insert the spraying means 16 into the duct 13, at an end thereof opposite the end comprising the inlet orifice 15.

Figure 4:
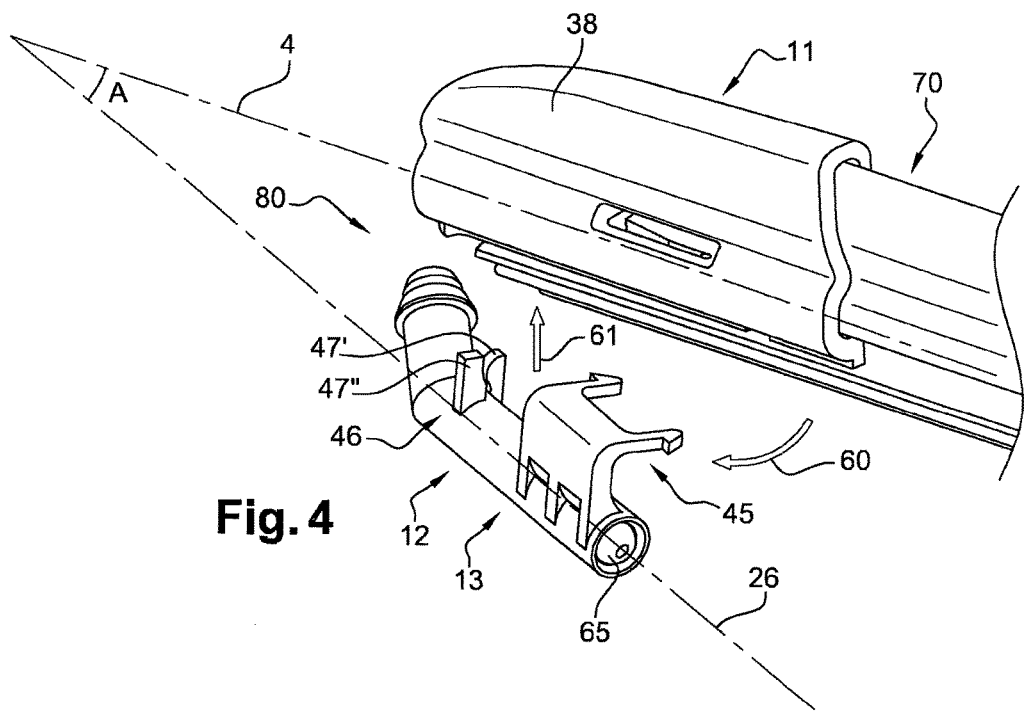
FIG. 4 is a perspective view of one end of a wiper equipped with an end fitting and a spraying device in the course of being mounted on the end fitting in accordance with the invention.

By way of the arrows with the references 60 and 61, FIG. 4 illustrates the first and second steps, respectively, of a method according to the invention for mounting an assembly as defined hereinabove.

According to the first step of the method, represented by the arrow 60:
the spraying device 12 is inclined with respect to the longitudinal axis 4, in the first plane.

It will be understood here that the spraying device 12 is rotated in the clockwise direction when the spraying device 12 is seen from above, that is to say when the deflector 10 formed on the wiper is seen first. This rotation is carried out through an angle with the reference A in FIG. 4. The rotation is carried out in the first plane and about an axis perpendicular to the first plane, that is to say about an axis which passes through the retention means 46, so as to position the spraying device 12 in such a way that the retention means 46 is positioned such that it can be fitted on the peripheral wall 38 of the end fitting 11.

When the retention means 46 comprises a first protuberance 47' and a second protuberance 47", the rotation in the first step of the method is carried out as explained above such that the space between the first protuberance 47' and the second protuberance 47" is at least equal to the thickness of the peripheral wall 38.

According to the second step of the method, represented by the arrow 61:
the retention means 46 is fitted on to the peripheral wall 38.

In this case an upward translation of the spraying device 12 is carried out, that is to say following an axis perpendicular to the first plane.

Figure 5:
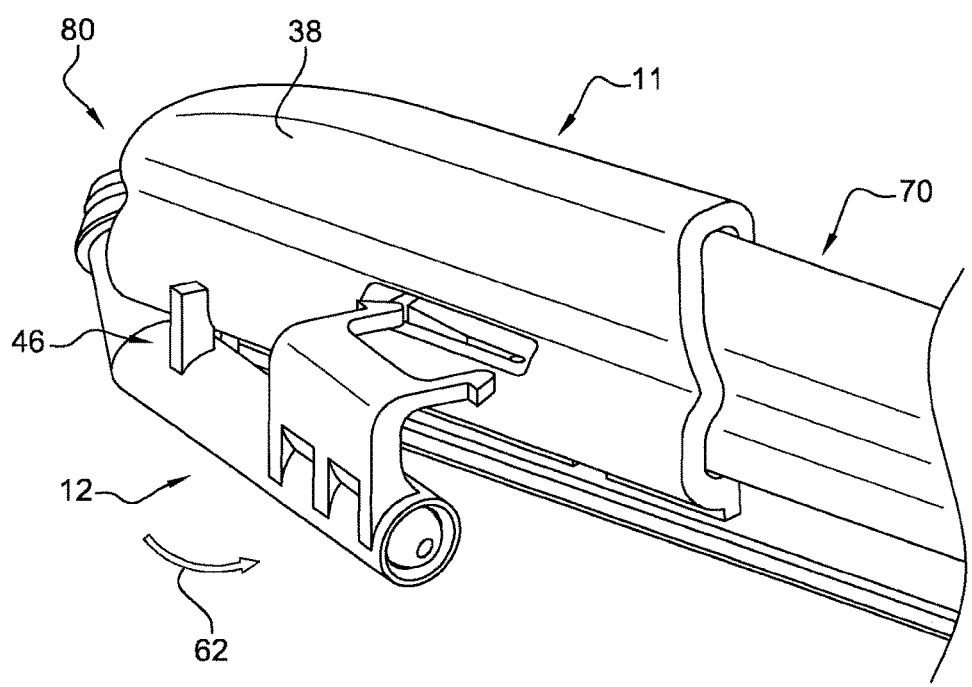
FIG. 5 is a view identical to the view in FIG. 4, showing a successive step in the mounting of a spraying device on an end fitting in accordance with the invention.

FIG. 5 shows the third step of the method according to the invention.

According to the third step of the method, represented by the arrow 62:
the spraying device 12 is rotated in the first plane in order to house the clip-fastening means 45 in the cavity 18.

The rotation carried out during the third step is carried out in the opposite direction to that in the first step. In other words, the rotation of the spraying device 12 is carried out here in the first plane, about an axis perpendicular to the first plane and in the anticlockwise direction when the spraying device 12 is viewed from above.

Thus, once the retention means 46 has been fitted on to the peripheral wall 38 of the end fitting 11, the spraying device 12 is rotated about an axis perpendicular to the first plane such that the clip-fastening means 45 passes into the cavity 18. The rotation is continued until the clip-fastening means 45 is clip-fastened inside the end fitting 11, inside the cavity 18.

When the clip-fastening means 45 is clip-fastened to the end fitting 11, the retention means 46 forms an additional fastening point with respect to the clip-fastening means 45. Such a disposition increases the mechanical integrity between the spraying device 12 and the end fitting 11.

In the example shown in FIG. 5, the clip-fastening means comprises the two arms 53 and 54 provided with their teeth 55. Thus, in this case, it is the teeth 55 which are clip-fastened in the cavity 18.

The invention is particularly suited to the possibility of extracting the wiper blade 1 from and/or inserting it into the end fitting 11 by translation along the longitudinal axis 4 with respect to the support 6. The end fitting 11 may thus have removable means for fastening to the wiper 70 in order to allow the extraction or insertion of the wiper blade, and at the same time to secure the position of the wiper blade after it has been replaced. In the event that the wiper blade is worn, it is possible to replace only the latter and to keep the other components such as the support 6, the deflector 10, the vertebra 5, the spraying device 12 and/or the end fitting 11, the service life of these components being greater than that of the wiper blade.

The invention claimed is:

1. An assembly comprising:
a wiper comprising a wiper blade configured to clean a windscreen;
an end fitting that is attached to a longitudinal end of the wiper blade; and
a device for spraying a liquid, said end fitting and said spraying device being two separate pieces that are mechanically connected,
wherein said end fitting comprises at least a peripheral wall and a bottom wall which defines the longitudinal end of the wiper blade,
wherein said end fitting comprises a recess which is able to receive a heel of the wiper blade and a face into which the recess opens, said face being formed in a manner set back from an edge which terminates the peripheral wall, at the opposite of the bottom wall, and
wherein said end fitting comprises a cavity having an opening formed on a peripheral wall of the end fitting, said cavity receives a means for securing the spraying device to the end fitting through the opening.

2. The assembly according to claim 1, wherein said end fitting comprises a recess which is able to receive a heel of a constituent wiper blade of the wiper and which extends along a longitudinal axis and in a first plane, said recess having an opening formed on a peripheral wall of the end fitting, said recess extending transversely to the longitudinal axis.

3. The assembly according to claim 2, wherein said opening is located on a flank of the peripheral wall which extends perpendicularly to the first plane.

4. The assembly according to claim 2, wherein the end fitting comprises a housing that is able to receive a constituent vertebra of the wiper, the housing being separated from the recess by an intermediate wall.

5. The assembly according to claim 1, wherein the end fitting has a profile complementary to the profile of a constituent support of the wiper.

6. The assembly according to claim 1, wherein the means for securing the spraying device comprises at least one clip-fastening means and a retention means.

7. The assembly according to claim 6, wherein said clip-fastening means comprises two branches that are each provided with a distal end comprising a tooth that is able to lock said two branches inside said cavity.

8. The assembly according to claim 6, wherein said clip-fastening means comprises a U-shaped extension, the central part of the U being provided with a fin which is inclined with respect to a plane in which the extension extends and which is able to lock said extension inside said cavity.

9. The assembly according to claim 1, wherein the spraying device comprises a duct having an inlet orifice and a means for spraying a liquid, a retention means being in the form of a plurality of protuberances which originate on the duct.

10. The assembly according to claim 9, wherein at least two protuberances are offset in the direction of extension of the duct so as to allow the peripheral wall of the end fitting to pass between the two protuberances.

11. The assembly according to claim 9, wherein said duct has an elbow.

12. The assembly according to claim 9, wherein said spraying means is produced in one piece with said duct.

13. The assembly according to claim 9, wherein said spraying means is a piece fitted into said duct.

14. An assembly comprising:
an end fitting that is attached to a longitudinal end of a wiper; and
a device for spraying a liquid, said end fitting and said spraying device being two separate pieces that are mechanically connected,
wherein said end fitting comprises a cavity which receives a means for securing the spraying device to the end fitting,
wherein said end fitting comprises a recess which is able to receive a heel of a constituent wiper blade of the wiper, and
wherein the end fitting comprises a housing that is able to receive a constituent vertebra of the wiper, the housing being separated from the recess by an intermediate wall.

15. An assembly comprising:
an end fitting that is attached to a longitudinal end of a wiper; and
a device for spraying a liquid, said end fitting and said spraying device being two separate pieces that are mechanically connected,
wherein said end fitting comprises a cavity which receives a means for securing the spraying device to the end fitting,
wherein the end fitting comprises a housing that is able to receive a constituent vertebra of the wiper, and
wherein said end fitting comprises a recess which is able to receive a heel of a constituent wiper blade of the wiper, the housing being separated from the recess by an intermediate wall.

* * * * *